United States Patent Office 3,185,727
Patented May 25, 1965

3,185,727
HYDROGENATION PROCESS
Jack Kwiatek and Irving L. Mador, Cincinnati, Ohio, assignors to National Distillers and Chemical Corporation, New York, N.Y., a corporation of Virginia
No Drawing. Filed Feb. 10, 1961, Ser. No. 88,288
2 Claims. (Cl. 260—491)

The present invention relates to a novel process for homogeneous hydrogenation of aliphatic olefinic compounds containing a

group which is conjugated with a carbonyl group as in such compounds in which the carbonyl may be in a group such as carboxyl, ketone, aldehyde, ester, amide, etc., whereby to saturate the olefinic group without reduction of the carbonyl function.

The present invention is based on the discovery that an aliphatic olefinic compound containing a

group conjugated with a carbonyl group can be saturated at the

group, without reduction of the carbonyl group, by reacting such an aliphatic, olefinic compound, in the presence of hydrogen, with an aqueous solution containing cyanide anions and ions of a metal from the group consisting of cobalt, rhodium and iridium.

The reaction embodied herein may be carried out under rather mild conditions, such as at room temperature and low hydrogen pressure, such as at one atmosphere. However, if desired, higher temperatures and hydrogen pressures can be used and, for example, temperatures up to about 125° C., and elevated hydrogen pressures, such as up to about 3000 p.s.i.

For carrying out the reaction embodied herein, the cobalt group metal ions are provided in the reaction mixture by use of a water-soluble salt of such a metal. For that purpose, such salts of organic or inorganic acids may be used and, for example, salts of such metals such as nitrates, acetates, sulfates, carbonates, chlorides, etc. Regarding the cyanide anions, they are provided in the reaction mixtures preferably by use of water-soluble alkali metal cyanides, such as sodium cyanide, potassium cyanide, etc. Thus, in preferred embodiments, the cyanide anions are provided by use of sodium cyanide, potassium cyanide, and mixtures of cobalt cyanide with potassium cyanide and/or sodium cyanide.

The process embodied herein is carried out with the catalytic solution having a pH of at least 7. Since reaction of the cobalt group metal with, for example, the alkali metal cyanide produces a basic solution (e.g., pH 10-12), supplementary base need be added only when either the substrate or the reaction product decreases the pH of the solution below 7.

Although the ratio of cyanide anions to cobalt ions present in the reaction mixture may be varied, the invention is generally carried out using a ratio of from about two to about ten cyanide anions per ion of the cobalt group metal and, more specifically, from about three to about six cyanide anions per ion of such a metal, such ratios being obtained by appropriate use of the required amounts of the substance or substances employed to provide the cyanide anions and cobalt group metal ions.

In the process of this invention, the ions of the cobalt group metal function as a catalyst and, hence, only catalytic amounts thereof are required based on the olefinic compound to be hydrogenated. Thus, although the amount of such metal ions utilized for practice of the process embodied herein can be varied over a rather wide range, the process is generally carried out using a concentration of from about 0.001 to about 1.0 mole of the cobalt group metal ion per mole of the starting olefinic compound to be hydrogenated and, more preferably, 0.01 to 0.3 mole of the metal ion per mole of the stated olefinic compound.

As aforesaid, the process embodied herein is carried out in liquid phase with the stated metal ions and cyanide anions being in aqueous solution. In certain instances, it may be necessary or desirable to effect or improve the solution of such ions and anions by use of a solvent and, for such a purpose, substances such as methanol, ethanol, dioxane, tetrahydrofuran, etc., may be used and which are otherwise inert with respect to the reactants and the products of the reaction.

As aforesaid, the invention relates to hydrogenation of aliphatic olefinic compounds containing a

group conjugated with a carbonyl group. More specifically, compounds of such structural characteristics useful for practice of this invention include 2-methyl-2-pentenal to produce α-methyl valeraldehyde; tiglaldehyde to produce α-methylbutyraldehyde, methacrylic acid to produce isobutyric acid; itaconic acid to produce methyl succinic acid; sorbic acid to produce hexenoic acid; methyl methacrylate to produce methyl isobutyrate; methacrylamide to produce isobutyramide; methyl isopropenyl ketone to produce methyl isopropyl ketone, etc.

In order to further describe the invention, the following embodiments are set forth for purposes of illustration and not limitation:

The apparatus consisted of a 500 ml. three-necked flat-bottom Morton flask with a Teflon-coated rod magnet driven by a "Mag-Mix" stirrer. The flask was fitted with a 125 ml. additional funnel with equilibrator, a serum cap on the center neck, and a 250 ml. gas burette with leveling bulb.

*Example I*

0.10 mole NaOH (aqueous solution), 0.05 mole itaconic acid, and 0.03 mole CoCl₂ were dissolved in 125 ml. of water and the solution introduced into the flask. The flask was then flushed with hydrogen and finally blanketed with hydrogen at atmospheric pressure. Then, 100 ml. of an aqueous solution of 0.153 mole KCN was added dropwise with stirring, and the amount of hydrogen absorbed recorded on a gas burette. Stirring was continued until the hydrogen uptake ceased. A total of 1372 ml. of hydrogen was absorbed in 75 minutes. The product was acidified with conc. HCl, and the solution extracted with ether. By evaporation of solvent and recrystallization from benzene, 2.4 grams of methylsuccinic acid was recovered, melting at 111.5–112° C. (literature value, 111–112° C.).

*Example II*

Following the procedure of Example I, but starting with an aqueous solution containing 0.10 mole KOH and 0.10 mole sorbic acid, a total of 2424 ml. of hydrogen was absorbed. The reaction mixture was acidified with conc. HCl and extracted with ether. By distillation, 9.3 g. of 2-hexenoic acid was recovered. The product melted at 31–34° C. (literature value, 32–33° C.).

*Example III*

Following the procedure of Example I, but starting with the preformed salt, sodium methacrylate (0.10 mole), a total of 2677 ml. of hydrogen was absorbed. The reaction mixture was acidified with conc. HCl and extracted with ether. By distillation, 8.2 g. of isobutyric acid was recovered. The product boiled at 151–152.5° C./760 mm. Hg (literature value, 155° C.). An infrared spectrum further confirmed the identity of the product.

*Example IV*

Following the procedure of Example I, but starting with 0.08 mole 2-methyl-2-pentenal, a total of 1820 ml. of hydrogen was absorbed. By distillation, 2.7 g. of 2-methylvaleraldehyde was recovered. The product boiled at 48–9° C./65 mm. Hg and yielded a 2,4-dinitrophenylhydrazone derivative with a melting point of 96–99° C. (literature value, 102–104° C.).

*Example V*

Following the procedure of Example I, but starting with 0.10 mole tiglaldehyde, a total of 1732 ml. of hydrogen was absorbed. By distillation, 2.1 g. of 2-methylbutyraldehyde was recovered. The product boiled at 86–88° C./760 mm., and yielded a 2,4-dinitrophenylhydrazone derivative with a melting point of 130–132° C. (literature value, 129–130° C.). An infrared spectrum further confirmed the identity of the product.

*Example VI*

Following the procedure of Example I, but starting with 0.09 mole methyl methacrylate, a total of 2213 ml. of hydrogen was absorbed. By distillation, 3.9 g. of methyl isobutyrate was recovered; acidification yielded 1.0 g. isobutyric acid. The former product boiled at 91–92° C./760 mm. Hg, and exhibited a $n_D^{23}$, 1.3824 (literature value, $n_D^{20}$, 1.3840). The latter product boiled at 154° C. and exhibited a $n_D^{22}$, 1.3928 (literature value, $n_D^{20}$, 1.3930). An infrared spectrum further confirmed the identity of the products.

*Example VII*

Following the procedure of Example I, but starting with an aqueous solution containing 0.10 mole methacrylamide, a total of 1705 ml. of hydrogen was absorbed. The reaction mixture was acidified and extracted with ether. Distillation yielded a few drops of isobutyric acid with a boiling point of about 148° C./760 mm. Hg. The distillation residue was recrystallized from benzene to yield 3.0 g. of isobutyramide. This product melted at 128–129° C. (literature value, 128–129° C.).

*Example VIII*

The reaction flask was charged with 100 ml. of an aqueous solution containing 0.03 mole $CoCl_2$. The flask was flushed with hydrogen and finally blanketed with hydrogen at atmospheric pressure. Then, 100 ml. of an aqueous solution containing 0.153 mole KCN was added with stirring and the complex formed absorbed 268 ml. hydrogen in 10 minutes. Then 0.1 mole methyl isopropenyl ketone was introduced through the serum stopper. Following this addition, 301 ml. of hydrogen was absorbed with formation of methyl isopropyl ketone.

While there are above disclosed but a limited number of embodiments of the process of the invention herein presented, it is possible to produce still other embodiments without departing from the inventive concept herein disclosed, and it is desired therefore that only such limitations be imposed on the appended claims as are stated therein.

What is claimed is:

1. A homogeneous hydrogenation process which comprises contacting an aliphatic olefinic compound containing a

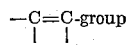

conjugated with a carbonyl group, in the presence of hydrogen, with an aqueous solution containing cyanide anions and ions of a cobalt group metal, said aqueous solution having a pH of at least 7.

2. A homogeneous hydrogenation process which comprises contacting an aliphatic olefinic compound containing a

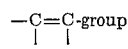

conjugated with a carbonyl group, said compound being selected from the group consisting of 2-methyl-2-pentenal, tiglaldehyde, methacrylic acid, itaconic acid, sorbic acid, methyl methacrylate, methacrylamide and methyl isopropenyl ketone, under a hydrogen pressure of from about one atmosphere to about 3000 p.s.i., at from about room temperature (20° C.) to about 125° C. with an aqueous solution having a pH of at least 7 containing from about two to about ten cyanide anions per ion of a cobalt group metal and from about 0.001 to about one mole of the cobalt group metal per mole of the olefinic compound.

References Cited by the Examiner

UNITED STATES PATENTS

| 2,077,421 | 4/37 | Lazier | 260—601 |
| 2,122,812 | 7/38 | Groll et al. | 260—491 |
| 2,674,634 | 4/54 | Greenfelder et al. | 260—526 |
| 2,773,895 | 12/56 | Ballard et al. | 260—491 |
| 2,825,743 | 3/58 | MacLean et al. | 260—601 |

OTHER REFERENCES

Sidgwick: Chemical Elements and Their Compounds, vol. II, pages 1376, 1380, 1383, 1384, 1388, 1392–93, 1396–98 (1950).

LORRAINE A. WEINBERGER,
*Acting Primary Examiner.*

ABRAHAM H. WINKELSTEIN, LEON ZITVER,
*Examiners.*